US010870741B2

(12) United States Patent
Ahmad

(10) Patent No.: US 10,870,741 B2
(45) Date of Patent: Dec. 22, 2020

(54) SILVER CONTAINING ANTIMICROBIAL MATERIALS

(71) Applicant: Zahir Ahmad, Dubai (AE)

(72) Inventor: Zahir Ahmad, Dubai (AE)

(73) Assignee: NOVEL TECHNOLOGIES HOLDINGS LIMITED, Manchester (GB)

( * ) Notice: Subject to any disclaimer, the term of this patent is extended or adjusted under 35 U.S.C. 154(b) by 80 days.

(21) Appl. No.: 15/480,610

(22) Filed: Apr. 6, 2017

(65) Prior Publication Data

US 2017/0290329 A1 Oct. 12, 2017

(30) Foreign Application Priority Data

Apr. 6, 2016 (GB) .................................. 1605892.7

(51) Int. Cl.
*A01N 25/10* (2006.01)
*C08K 3/08* (2006.01)
(Continued)

(52) U.S. Cl.
CPC .............. *C08K 3/015* (2018.01); *A01N 25/10* (2013.01); *A01N 25/34* (2013.01); *A01N 59/16* (2013.01); *B29C 48/022* (2019.02); *C08J 3/226* (2013.01); *C08K 3/08* (2013.01); *D01F 1/103* (2013.01); *B29K 2023/12* (2013.01); *B29K 2105/0011* (2013.01); *B29K 2505/14* (2013.01); *C08J 2323/12* (2013.01); *C08J 2367/00* (2013.01); *C08J 2423/12* (2013.01); *C08J 2467/00* (2013.01); *C08K 2003/0806* (2013.01);
(Continued)

(58) Field of Classification Search
None
See application file for complete search history.

(56) References Cited

U.S. PATENT DOCUMENTS 6,979,491 B2 * 12/2005 Yan ........................ D02G 3/449 106/1.13
2005/0022328 A1 2/2005 Weihrauch et al.
(Continued)

FOREIGN PATENT DOCUMENTS

CN 103590135 2/2014
CN 105133056 12/2015
(Continued)

OTHER PUBLICATIONS

International Search Report and the Written Opinion of the International Searching Authority, International Application No. PCT/IB2017/051984, Jun. 8, 2017, 21 pages.
(Continued)

*Primary Examiner* — Dominic Lazaro
(74) *Attorney, Agent, or Firm* — Morgan, Lewis & Bockius LLP

(57) ABSTRACT

This invention relates to antimicrobial materials and articles, such as fibres, yarns, and their incorporation into textiles, packaging for food or beverages, or articles of clothing such as gloves. The antimicrobial fibres and yarns may be formed of a polymer and may comprise silver particles dispersed therein. The present invention contemplates a polymer batch precursor to the fibre of the invention and further products formed of the fibre or the polymer batch, for example textiles.

31 Claims, 5 Drawing Sheets

(51) Int. Cl.

| | |
|---|---|
| ***D01F 6/06*** | (2006.01) |
| ***A01N 59/16*** | (2006.01) |
| ***A01N 25/34*** | (2006.01) |
| ***C08K 3/015*** | (2018.01) |
| ***B29C 48/00*** | (2019.01) |
| ***D01F 1/10*** | (2006.01) |
| ***C08J 3/22*** | (2006.01) |
| *D01F 6/62* | (2006.01) |
| *B29K 23/00* | (2006.01) |
| *B29K 105/00* | (2006.01) |
| *B29K 505/14* | (2006.01) |

(52) U.S. Cl.

CPC .... *C08K 2201/005* (2013.01); *C08L 2205/16* (2013.01); *D01F 6/06* (2013.01); *D01F 6/62* (2013.01); *D10B 2321/022* (2013.01); *D10B 2401/13* (2013.01)

(56) References Cited

U.S. PATENT DOCUMENTS

| | | | | |
|---|---|---|---|---|
| 2009/0214771 | A1* | 8/2009 | Shin | D01F 1/103 427/180 |
| 2010/0166832 | A1 | 7/2010 | Ingle et al. | |
| 2012/0094120 | A1 | 4/2012 | Foss et al. | |
| 2014/0141073 | A1 | 5/2014 | Gabbay | |
| 2014/0221543 | A1* | 8/2014 | Wang | B22F 1/0018 524/403 |
| 2014/0374941 | A1 | 12/2014 | Foss et al. | |
| 2015/0147570 | A1 | 5/2015 | Foss | |

FOREIGN PATENT DOCUMENTS

| | | | |
|---|---|---|---|
| EP | 0454005 | A2 | 10/1991 |
| KR | 2009/0076193 | | 7/2009 |
| KR | 20100007450 | A | 1/2010 |
| KR | 2014/0072605 | | 6/2014 |
| WO | 2008/100163 | | 8/2008 |

OTHER PUBLICATIONS

Intellectual Property Office Search Report, Application No. GB1605892.7, dated May 31, 2016, 5 pages.

China National Intellectual Property Notification of the First Office Action for patent application No. 2017800061223, dated May 8, 2020, 10 pages.

* cited by examiner

SILVER CONTAINING ANTIMICROBIAL MATERIALS

This application claims the benefit of and priority to GB Application No. 1605892.7, filed Apr. 6, 2016, the entire disclosure of which is hereby incorporated by reference.

This invention relates to antimicrobial materials and articles, such as fibres, yarns, and their incorporation into textiles, packaging for food or beverages, or articles of clothing such as gloves. The antimicrobial fibres and yarns may be formed of a polymer and may comprise silver particles dispersed therein. The present invention contemplates a polymer batch precursor to the fibre of the invention and further products formed of the fibre of the invention and further articles formed of the polymer batch, for example textiles. The present invention also relates to methods for producing the antimicrobial materials.

BACKGROUND

Silver has been used as an antimicrobial agent for a number of years. The antimicrobial activity of silver has been exploited in various Applications, for example in wound dressings, creams and as a coating on medical devices.

The use of silver as a coating on fibres has been disclosed in US 2010/0166832. In US 2010/0166832 silver coated nylon fibres are disclosed. The document enables the production of fabrics with a single silver coated nylon surface, thereby allowing a dye to be applied to an opposite side of the nylon fabric. The silver is coated onto nylon fibres using an electrolessly plating method. Similarly, there is a product marketed as X-STATIC® which is a nylon yarn electrolessly plated with silver. The silver completely covers the nylon yarn. Coating a fibre or yarn with silver has the disadvantage that the silver may be removed from the fibre or yarn by washing fabrics comprising the coated fibre or yarn. Consequently the antimicrobial efficacy of the fibre is lessened. This effect can be exacerbated by the use of washing detergents or increased temperatures. As such, the X-STATIC® product is recommended to be washed in the absence of harsh detergents, in the absence of fabric softeners, in the absence of bleach and at low temperatures.

Thus, a fibre that is resistant to loss of silver through the action of washing is desired. In addition, a fibre that can be subjected to high wash temperatures and is capable of being washed in any detergent with or without fabric softener or bleach is desired. Finally, antimicrobial X-STATIC® is only available in dark colours. This is believed to be a feature of the technology used to provide antimicrobial activity. It is desirable to provide textiles in a range of different colours including light colours.

In US 2014/0141073 copper salts were used to produce antiviral polymeric materials. The antiviral materials are prepared by dispersing a powder of copper salts cuprous oxide and cupric oxide in a slurry of a hydrophilic polymeric material. However, the incorporation of copper salts was not applicable to a broad range of polymers. Polyester fibres comprising the copper salts were observed to have copper oxide protruding from the surface of the polymer. This technology results in textiles that exhibit a bronze, or light brown colour.

Yarns formed of a polymer comprising copper are commercially available. Cupron produce a copper based yarn where the copper is directly incorporated in fibres and yarns. However, the yarns comprising copper have to be used in an amount of around 45% to 50% of any textile product to be most effective. This high amount of copper containing yarns needed in a textile increases the cost of textiles.

Related applications US 2012/0094120 and US 2014/0374941 disclose the use of powdered metal alloys as an antimicrobial agent in an extruded polymer fibre.

Silver nanoparticles and colloidal silver have also been used to provide antimicrobial properties to polymer fibres. However, the use of nanoparticulate silver and colloidal silver are undesirable due to regulatory control surrounding nanoparticles. In addition, silver nanoparticles and colloidal silver are disfavoured due to the possibility of migration of silver nanoparticles into a subject using a product containing the nanoparticulate silver. It is also possible that nanoparticulate silver can leach out of the material in which the silver nanoparticles have been placed.

As such, there is a need for an antimicrobial fibre, yarn and/or textile that does not contain nanoparticulate or colloidal silver. However, it is accepted wisdom within the art that silver particles should be in the nano-scale size in order to enable extrusion of a polymer to form a polymer fibre. Particles larger than nano-scale sized particles are known to block extruders due to the larger particle size and further due to agglomeration of the silver particles. It is also necessary to provide an antimicrobial fibre that can produce cost effective textiles, whereby the amount of antimicrobial fibre is present in a relatively low amount within the textile as a whole. In certain embodiments the present invention solves these, and other, problems.

BRIEF DESCRIPTION OF THE DRAWINGS

Embodiments of the invention are further described hereinafter with reference to the accompanying drawings, in which.

Figure 1A:
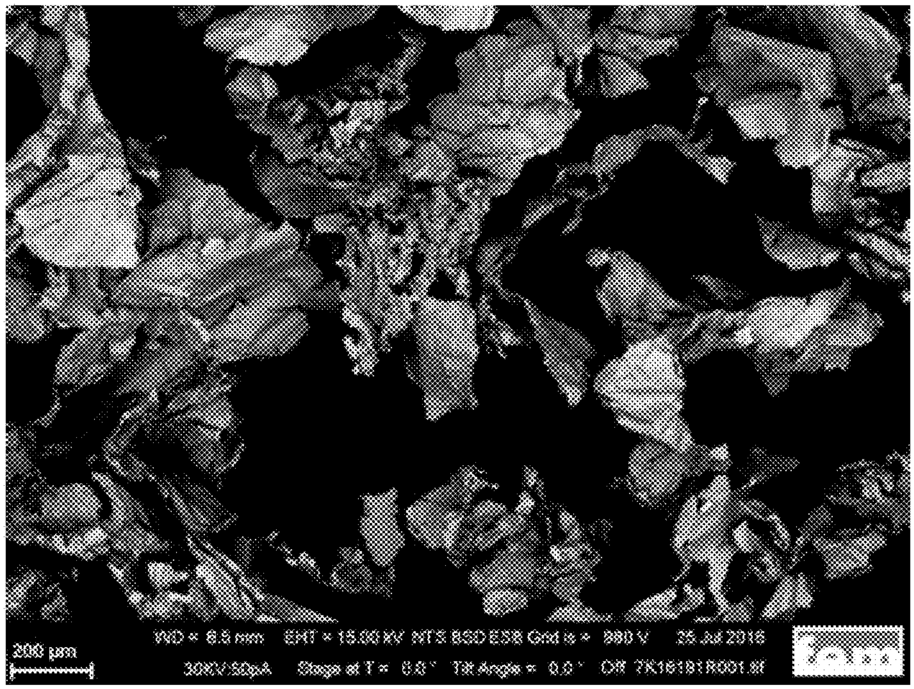
FIGS. 1A and 1B are SEM (scanning electron microscope) images of particles formed by grinding silver leaf.
Figure 1B:
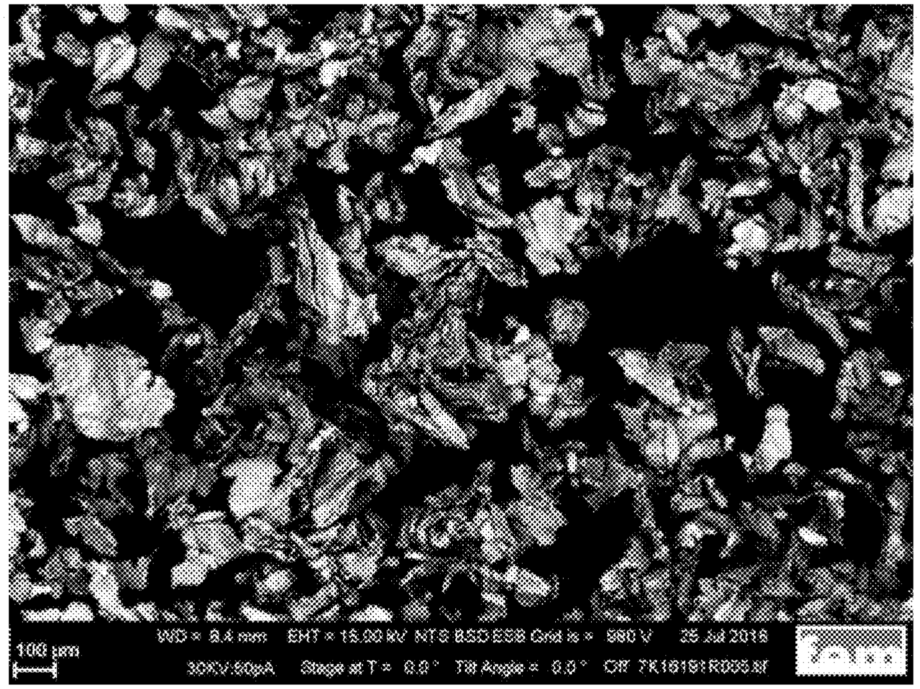
Figure 2A:
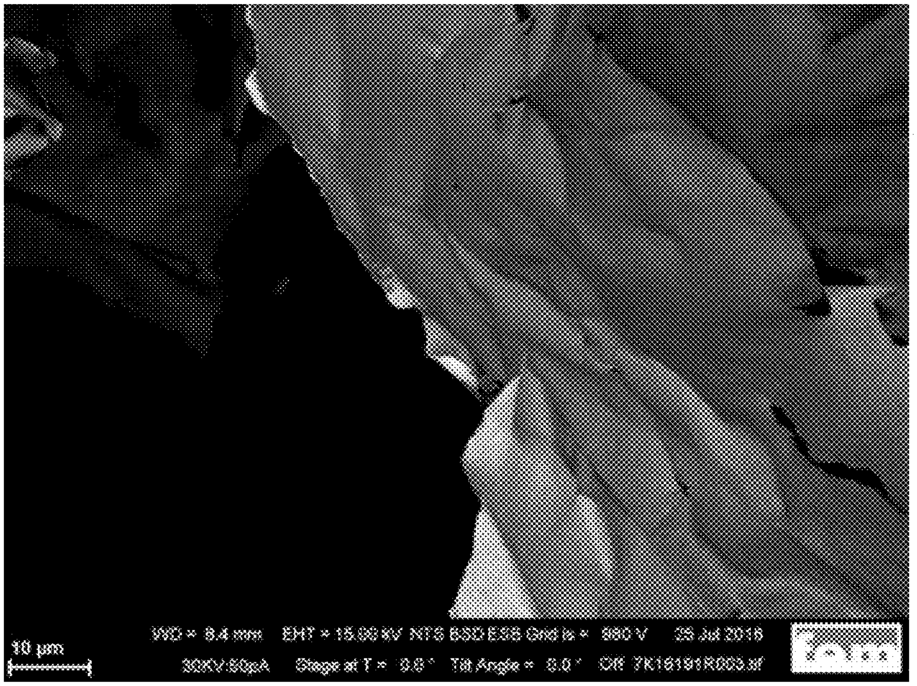
FIGS. 2A, 2B, 3A, and 3B are magnified areas of the SEM images of FIGS. 1A and 1B respectively.
Figure 2B:
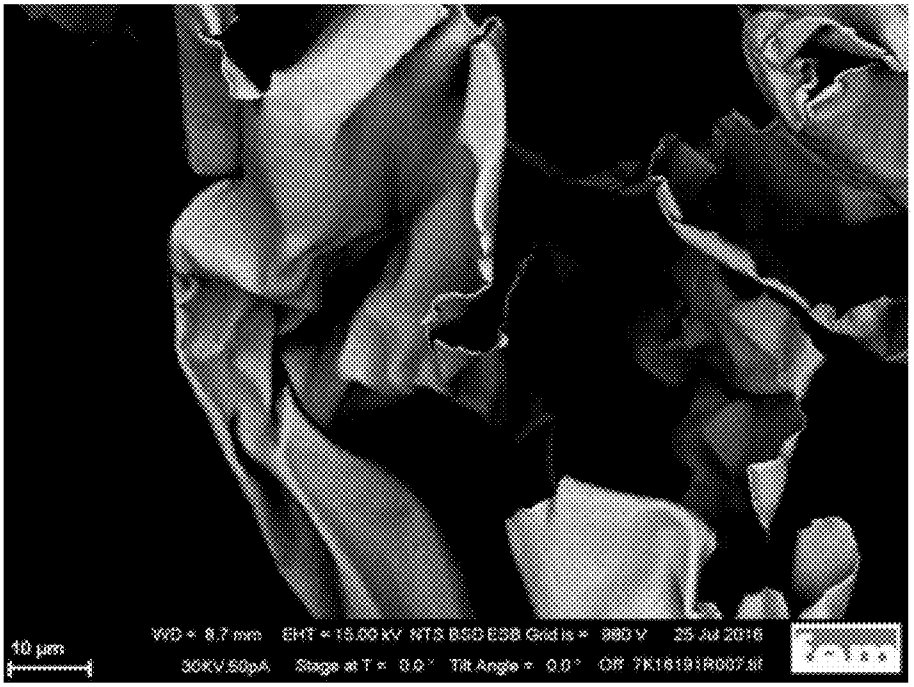
Figure 3A:
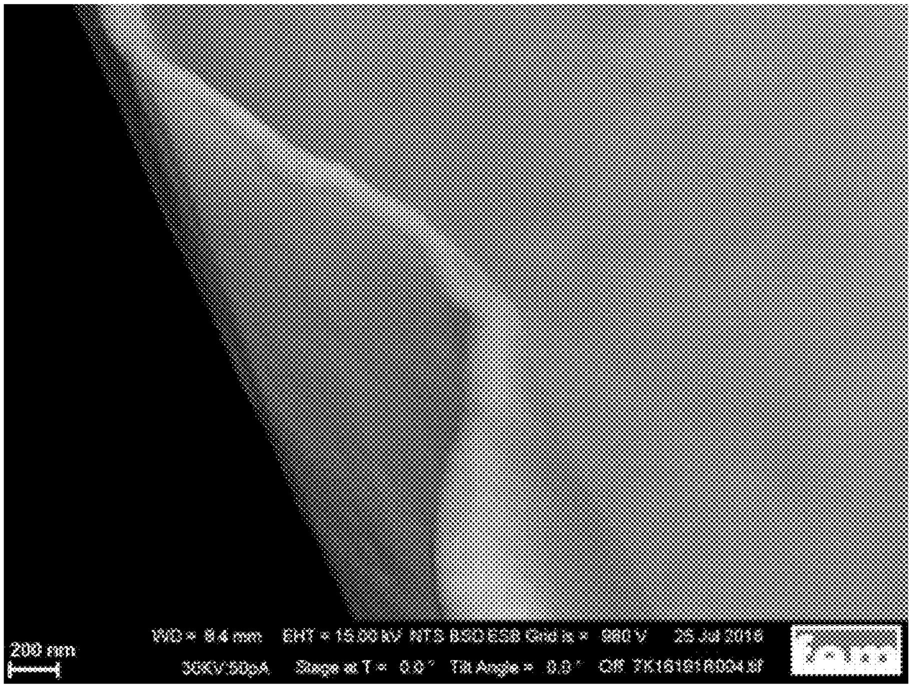
Figure 3B:
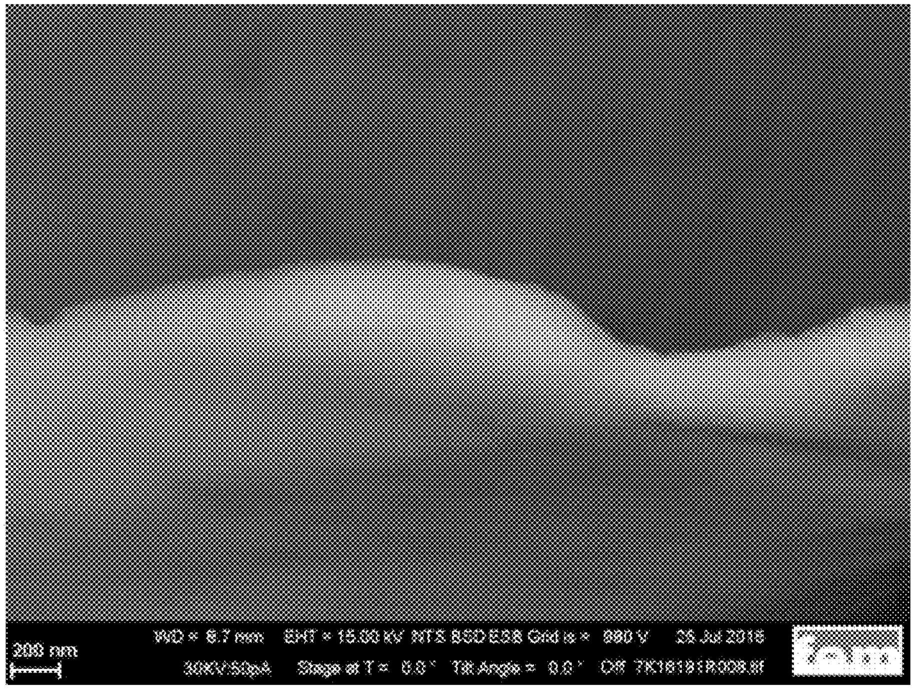
Figure 4:
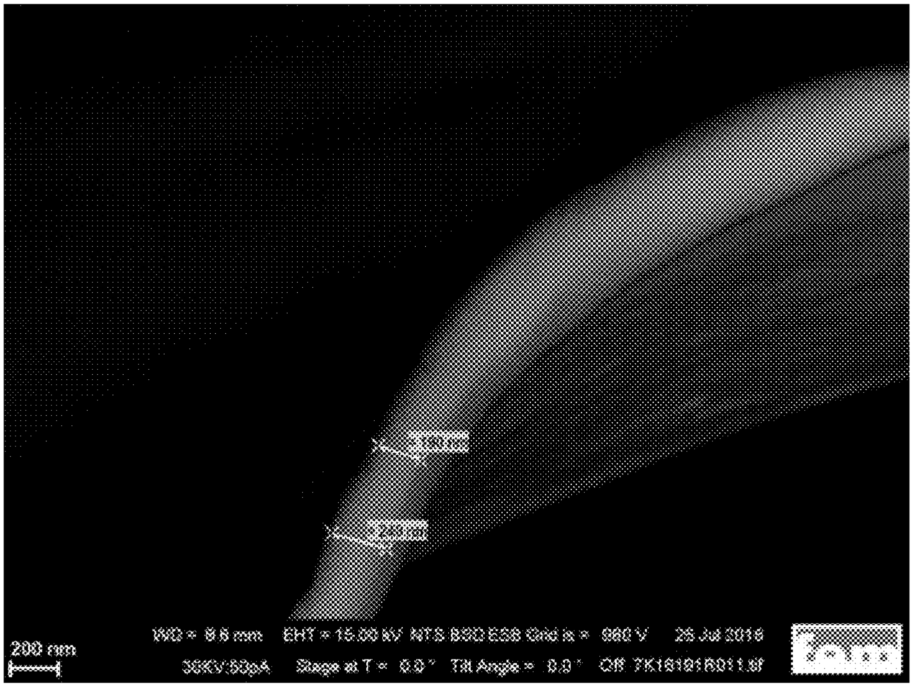
FIG. 4 is a magnified version of FIG. 1B showing a thickness measurement of the particle.

The present invention aims to provide a solution to the above problems by using silver particles produced by grinding silver leaf. In accordance with the present invention there is provided a polymer batch comprising a polymer material and silver particles, wherein the silver particles have a size characteristic of particles formed by grinding silver leaf. The polymer batch may be in a solid form, for example in chips, or the polymer batch may be in a molten form.

Accordingly in an aspect of the invention there is provided a polymer batch comprising a polymer material and silver particles, wherein the silver particles are obtainable by grinding silver leaf. The polymer material may be molten.

The polymer batch may comprise silver particles in an amount of from about 0.1% to about 10% by weight of the polymer batch. Optionally, the polymer batch contains silver particles in an amount of about 0.1% to about 5% by weight of the polymer batch. Preferably, the polymer batch contains silver particles in an amount of about 0.5% to about 4%, about 0.5% to about 3%, about 0.1% to about 3%, by weight. In a particularly preferred embodiment the polymer batch contains silver particles in an amount of about 1.5% to about 2.5% by weight of the polymer batch, for example 2%. The polymer batch comprising these amounts of silver particles may be a master batch. The master batch may be solid, for example in chips, or molten.

The master batch may be combined with further polymer material. The master batch may be mixed with the further polymer material in an amount of from 1% to 10% by weight of the further polymer material. Optionally, the master batch is mixed in an amount of 2% to 8% (preferably 3% to 5%) by weight of the further polymer material.

Accordingly, in an embodiment the invention provides a polymer batch comprising 1% to 10% of a master batch, wherein the master batch is as defined elsewhere herein, and a polymer material. Optionally, the master batch is present in an amount of 2% to 8% (preferably 3% to 5%).

As such, the invention contemplates a polymer batch comprising a polymer material and silver particles in an amount of from about 0.003% to about 0.5% by weight, optionally from about 0.03% to about 0.5%, from about 0.03% to about 0.25%, from about 0.05% to 0.15%, from about 0.06% to 0.15%, from about 0.03% to 0.1% or from about 0.06% to 0.1%. Preferably, silver particles are present in an amount of from 0.05% to 0.15% or from 0.06% to 0.1%.

The combined master batch and further polymer material may be extruded to form a fibre. Accordingly, the present invention contemplates a fibre comprising a polymer material and silver particles, wherein the silver particles have a size characteristic of particles formed by grinding silver leaf. Alternatively, the present invention contemplates a fibre comprising a polymer material and silver particles, wherein the silver particles are obtainable by grinding silver leaf.

The fibre may comprise silver particles in an amount of from about 0.003% to about 0.5% by weight, optionally from about 0.03% to about 0.5%, from about 0.03% to about 0.25%, from about 0.05% to 0.15%, from about 0.06% to 0.15%, from about 0.03% to 0.1% or from about 0.06% to 0.1%. Preferably, silver particles are present in an amount of from 0.05% to 0.15% or from 0.06% to 0.1%.

The fibre may be from 1 to 3 denier. The fibre may have a diameter of from 0.5 mm to 5 mm, optionally from 1 mm to 4 mm, from 1 mm to 3 mm, from 2 mm to 4 mm, from 2 mm to 2.5 mm. Preferably the fibre will have a dimension of from 2 mm to 2.5 mm.

Fibres of the invention may be processed into yarns or textiles. The yarns may also be further processed into textiles. Therefore, the present invention contemplates yarns comprising a multiplicity of fibres of the invention. Furthermore, the present invention contemplates textiles comprising a multiplicity of fibres and/or yarns of the invention.

Yarns of the invention optionally comprise a multiplicity of fibres of the invention and a multiplicity of other fibres not of the invention. The fibres of the invention and the other fibres may be of the same or a different polymer material. Similarly, textiles of the invention may comprise a multiplicity of fibres and/or yarns of the invention and a multiplicity of other fibres and/or yarns not of the invention. The fibres or yarns of the invention and the other fibres or yarns may be of the same or a different polymer material.

Yarns of the invention may be formed by blending a fibre of the invention with other textile fibres, for example polyester fibres, cotton fibres, wool fibres, polypropylene fibres, nylon fibres, or polyamide fibres. Accordingly, yarns of the invention may comprise a fibre of the invention and a fibre selected from polyester fibres, cotton fibres, wool fibres, polypropylene fibres, nylon fibres, or polyamide fibres, preferably cotton fibres.

Yarns of the invention are multi filament yarns and may be from 40 to 200 denier, for example 50 to 150 denier. Optionally the yarns are 50 denier, 75 denier or 150 denier.

Textiles of the invention may comprise in an amount of fibres or yarns of the invention from about 1% to about 10% by weight of the textile. Optionally, the textile comprises from about 1% to about 6% (preferably about 2% to about 5% or about 4% to about 8%) by weight of the textile product.

The thickness of silver leaf used to prepare the silver particles is thought to play an important role in the invention. The silver leaf may have a thickness of less than 1 μm, optionally less than 0.5 μm or less than 0.1 μm. Preferably, the silver leaf has a thickness of from 0.01 to 0.1 μm, for example about 0.03 μm. Alternatively, the silver leaf may have a thickness of less than 1 μm, optionally less than 0.5 μm or less than 0.3 μm. The thickness of the silver leaf may be from 0.01 to 0.5 μm or 0.1 to 0.3 μm, for example about 0.2 μm.

The silver particles of the invention are preferably non-spherical. As the skilled person will appreciate, non-spherical particles will generally have three dimensions, a length, width and depth. Throughout the present application the depth of the silver particles will be considered to be derived from the thickness of the silver leaf. Therefore, any disclosure of a silver leaf thickness will equate to the depth of the silver particles.

The thickness or depth of the silver particles can be measured by any appropriate method. However, a scanning electron microscope represents a particularly useful tool for measuring the size of silver particles present in the invention.

Accordingly, in another aspect of the invention there is provided a polymer batch comprising a polymer material and silver particles, wherein the silver particles have a depth of less than 1 μm, optionally less than 0.5 μm or less than 0.1 μm. The silver particles may have a size of about 0.1 μm to about 10 μm. Preferably, the silver particles have a depth of from 0.01 to 0.1 μm, for example about 0.03 μm. Alternatively, the silver particles may have a depth of less than 1 μm, optionally less than 0.5 μm or less than 0.3 μm. The depth of the silver particles may be from 0.01 to 0.5 μm or 0.1 to 0.3 μm, for example about 0.2 μm.

Any mention of the size of the silver particles relates to the length and width of the silver particles. The silver particles may have a size characteristic of particles formed by grinding silver leaf, the size, i.e. a length and/or width, being from about 0.1 μm to about 10 μm, optionally from about 0.5 μm to about 10 μm; or from about 0.5 μm to about 8 μm; or from about 1 μm to about 6 μm; or from about 1 μm to about 4 μm; or from about 2 μm to about 3 μm. Preferably, the silver particles will have a size of about from 2 μm to about 3 μm.

The silver particles may have a size of from about 0.5 μm to about 10 μm and a depth of less than 0.5 μm or less than 0.1 μm; or a size from about 0.5 μm to about 8 μm and a depth of less than 0.5 μm or less than 0.1 μm; or a size of from about 1 μm to about 6 μm and a depth of less than 0.5 μm or less than 0.1 μm; or a size of from about 1 μm to about 4 μm and a depth of less than 0.5 μm or less than 0.1 μm; or a size of from about 2 μm to about 3 μm and a depth of less than 0.5 μm or less than 0.1 μm.

The silver particles may have a size of from about 0.5 μm to about 10 μm and a depth of less than 0.5 μm or less than 0.3 μm; or a size from about 0.5 μm to about 8 μm and a depth of less than 0.5 μm or less than 0.3 μm; or a size of from about 1 μm to about 6 μm and a depth of less than 0.5 μm or less than 0.3 μm; or a size of from about 1 μm to about 4 μm and a depth of less than 0.5 μm or less than 0.3 μm; or a size of from about 2 μm to about 3 μm and a depth of less than 0.5 μm or less than 0.3 μm.

Preferably, the silver particles have a size of from about 1 μm to about 10 μm and a depth of less than 0.5 μm, less than 0.3 μm, or less than 0.1 μm. Preferably, the silver particles have a size of from about 2 μm to about 3 μm and a depth of less than 0.5 μm, less than 0.3 μm, or less than 0.1 μm.

Preferably the silver particles in any aspect or embodiment of the invention may have a length of about 0.1 μm to about 10 μm a width of about 0.1 μm to about 10 μm, and a depth of less than 1 μm, optionally less than 0.5 μm, less than 0.3 μm, or less than 0.1 μm.

The textiles of the present invention may be in the form of a product selected from home textiles (e.g. towels, bed sheets, socks or denim), pet products (e.g. animal beds, animal coats or animal collars), medical products (e.g. gloves) or any other type of textile products. Accordingly the present invention contemplates any of these products comprising fibres, yarns or textiles of the present invention.

In an aspect, the present invention provides an article comprising a polymer batch as defined elsewhere herein. The article may be formed of the polymer batch. Accordingly, the article may comprise or be formed from a polymer material comprising silver particles, as defined elsewhere herein. The article may comprise fibres or yarns of the invention or the article may be formed of a single piece of polymer material. In an embodiment of the invention the article may be packaging (for example a food package or a drinks package). The article may be vacuum formed, moulded, extruded, knitted, woven or processed in another manner known to those skilled in the art The article may be apparel, home wear, or a plastic article. The article may be formed from fibres of the present invention or formed as a single piece. The apparel may be selected from: underwear, pants, bra, vest, singlet, boxer shorts, outerwear, trousers, shorts, socks, shirts, polo shirts, T-shirts, blouses, sweatshirts, hooded tops, gloves, skirts, trouser suits, dresses, coats, towelling clothing, sweat pants, sweat tops, raincoats, coat linings, anoraks, jackets, hats, baseball caps, irham, niqab, saree, burqa, gowns, wraps, scarves, pyjamas, night gown, robes, sportswear, footwear, linings for footwear, thermal tops, thermal leggings, uniforms, nurses uniforms, tunics, personal protective clothing, scrubs, all in one suits, boiler suits, military apparel and police apparel.

The home wear may be selected from: blankets, throws, furniture covers, upholstery, dish cloths, towels, flannels, carpets, doormats, rugs, wraps, blinds, curtains, cushion covers, pillow cases, mattress ticking, mattress toppers, quilts, table cloths, lamp shades, woven bags, hand bag liners, pet bedding, pet coats, pet blankets, car seat covers, automotive carpets, equine coats, equine covers, saddle cloths, tents, awning, ground sheet, flysheets, sails and holdalls.

The plastic article may be selected from: food storage containers, utensils, chopping boards, mixing bowls, toothbrushes, cosmetic brushes, cosmetic applicators, cosmetic containers, food bags, extruded articles, pipes, drains, guttering, tubing, cladding, phone covers, screen covers, keyboards, keyboard covers, medical packaging, rubber gloves, latex free rubber gloves, food packaging, threads, rope, tie wraps, tube caps, remote controls, moulded and pressed plastic closures and formers, seals, gaskets, trays, fridge components, toothbrushes, make-up cases, toilet seats, water filters, plastic cups, baby milk bottles, milk bottles, milk bags, shower curtains, electric cables, car plastic components, and head phone plastic components.

In an aspect, the present invention provides a glove comprising a polymer material and silver particles, as defined elsewhere herein. In an embodiment, the glove is not formed of fibres but is a single piece of polymer material.

In an aspect of the invention there is provided a method of producing a fibre comprising:

preparing silver particles by grinding silver leaf;

mixing the silver particles with a polymer material (the polymer material may be powdered or molten); and extruding the mixture of silver particles and the polymer material to form fibres.

The method may further comprise the intermediate steps of forming a master batch following mixing the silver particles with a molten polymer material. As such, the method of producing a fibre may comprise:

preparing silver particles by grinding silver leaf;

mixing the silver particles with a polymer material (the polymer material may be powdered or molten);

optionally melting the polymer material and silver particle mixture, when the polymer material is a powder;

extruding the mixture of silver particles and the polymer material;

pelletizing the extruded mixture to form master batch pellets;

mixing the master batch pellets with further polymeric material; and extruding a molten mixture of master batch pellets and the polymer material to form fibres.

In an aspect of the invention there is provided pellets comprising a polymer material and wherein the silver particles have a size characteristic of particles formed by grinding silver leaf. The silver particles may have a size as defined elsewhere herein.

In embodiments of the method, the silver particles may have the same size as discussed above. The silver particles may be present in the fibre or master batch in the same amounts as discussed above.

The master batch pellets may be mixed with the further polymer material in an amount of from 1% to 10% by weight of the further polymer material. Optionally, the master batch is mixed in an amount of 2% to 8% (preferably 3% to 5%) by weight of the further polymer material.

The further polymer material may be the same or different to the polymer material in the master batch. Preferably, the polymer material and the further polymer material are the same.

The polymer material may be any suitable polymer that is solid and can be melted. For example, the polymer material may be solid at room temperature. The polymer material may be a plastics material or a rubber material. The polymer material may be a polyester, a polyamide (for example nylon), polypropylene, natural rubber, latex free rubber, elastane rubber, or synthetic rubber.

The polymer material may be capable of being formed into an article of the invention. The polymer material, comprising silver particles as defined elsewhere herein, may be capable of being vacuum formed, moulded, extruded or processed in another manner known to those skilled in the art for the formation of articles, such as clothing items (e.g. gloves and other apparel items discussed elsewhere herein), food packaging (e.g. fruit packets, thin film, film wrap, plastic cartons, or plastic boxes and other home ware or plastics articles discussed elsewhere herein), or beverage packaging (e.g. bottles, bags, cartons, milk bottles, milk bags, milk cartons, fruit juice bottles, fruit juice bags, or fruit juice cartons).

In an aspect of the invention there is provided a fibre obtainable by the method of the present invention.

Textiles of the present invention can be prepared using known methods for producing textiles. In embodiments, textiles of the present invention comprise fibres or yarns of the present invention in at least the weft. Optionally, textiles of the invention comprise fibres or yarns of the present invention in the weft and not the warp or (where present) the pile. The weft may be a fibre of the invention. Alternatively the weft may be a combination of fibres of the invention and a fibre not of the invention, a standard fibre, for example a fibre of cotton, polyester, a polyamide (for example nylon), polypropylene, natural rubber, latex free rubber, elastane rubber, or synthetic rubber. The weft may be formed of a fibre of the invention and a fibre not of the invention (a standard fibre), wherein the fibre of the invention is present in a ratio of from 1:1 to 1:5 relative to the standard fibre. Optionally, the weft is formed of fibre in a ratio of 1:1 (fibre of the invention:standard fibre) or the weft is formed of fibre of the invention.

Preferably the weft is formed of fibre or yarn of the invention.

Silver particles comprised in all aspects and embodiments of the present invention can be prepared by grinding silver leaf. Any suitable grinder that results in silver particles with a largest dimension in the size range of 0.1 μm to 20 μm can be used. For example, silver particles can be produced with a 1000 W grinder having two stainless steel blades, for example a Panasonic Mixer Grinder. FIGS. 1 to 4 show SEM images of silver particles that may be produced with either a jet milling machine or a ball milling machine.

The amount of silver particles in a polymer batch, master batch, fibre or yarn can be determined by X-ray fluorescence (XRF). XRF can be used to measure the amount of silver in a unit area. XRF spectrometers are commercially available and any process for determining silver content per unit area can be used.

Silver particle size can be measured with scanning electron microscopy (SEM). Techniques for measuring particle size using SEM are known to those skilled in the art.

In an embodiment fibres, yarns and textiles of the invention have substantially the same antimicrobial activity after 25 washes, 50 washes, 75 washes or 100 washes at 60° C. Fibres, yarns and textiles of the present invention are also capable of being washed in the presence of detergents (for example harsh detergents, enzymatic detergents and non-enzymatic detergents), and/or in the presence of laundry bleach; and/or in the presence of fabric softeners. In addition fibres, yarns and textiles of the present invention are capable of being tumble dried at any temperatures. In contrast prior art silver textiles can only be tumble dried on a low heat.

In embodiments of the present invention the fibre or yarn is capable of being incorporated into a textile of any colour.

In a preferred embodiment the polymer batch does not comprise an agglomeration inhibitor. Accordingly, in preferred embodiments, the master batch, fiber textile or product of the invention does not comprise an agglomeration inhibitor. For example agglomeration inhibitors contemplated are fumed (pyrogenic) silica.

Example 1—Polypropylene Fibres

A fibre of the present invention was prepared by:

1) grinding silver leaf having a thickness of 0.03 micron into a powder with a size of between 1 and 10 microns;

2) mix around 20 grams of silver powder into 980 grams of polypropylene resin powder in a high speed mixer;

3) place the powder into an extruder and melt the powder;

4) once the polypropylene melts, extrude the polypropylene to give an extrudate 2 mm to 2.5 mm in diameter;

5) the extrudate goes through a water bath to cool and set the polypropylene;

6) the extrudate is placed in a pelletizer machine which forms pellets with a length of 2 to 3 mm.

The pellets are then mixed with a polypropylene polymer and extruded into fibres according to procedures known in the art.

Example 2—Polyester Fibres

Polyester fibres can be prepared by following the procedure of Example 1 and replacing the polypropylene with polyester throughout the process.

Example 3—Antimicrobial Activity of Polypropylene Fibres

A terry towel was prepared using 7% of the fibres of Example 1 and 93% cotton.

The terry towel was tested for antimicrobial activity following ISO 20743: 2011(E), the quantitative method. This method is designed to test the ability of fabrics that have been treated with antimicrobial agents to prevent microbial growth and to kill microorganisms. The antimicrobial test was carried out on a towel that had been washed at 60° C. for 0 washes, 50 washes and 100 washes. The antimicrobial activity was tested over a 20 hour period Test Conditions:

Sterilization of Sample: autoclaving

Neutralizer used: Buffered Saline with Triton X 100-0.01%

Contact Time: 20 hours

Contact Temperature: 370 C

Media and Reagent: Soyabean-casein digest agar

After 0 washes the antibacterial activity is shown in Tables 1 and 2 below.

TABLE 1

| Test Bacteria: *Escherichia coli* ATCC 11229 Quantitative Assessment ISO 20743: 2007(E) (Plate Count Method) | |
|---|---|
| Lab Control: Concentration of Inoculum at 0 hrs. ($C_0$) = 1.05 × $10^5$ CFU/ml | Log: 5.02 |
| Lab Control: Concentration of Bacteria on after 20 hours ($C_t$) = 3.50 × $10^6$ CFU/ml | Log: 6.80 |
| Growth Value of F (F = Log $C_t$ − Log$C_0$) = 1.78 | |

TABLE 1-continued

Test Bacteria: *Escherichia coli* ATCC 11229
Quantitative Assessment ISO 20743: 2007(E) (Plate Count Method)

| Sample | Concentration of Inoculum at 0 hrs. Test Fabric ($T_0$) | | Concentration of Bacteria at 20 hrs. Test Fabric ($T_t$) | | Growth Value | Antimicrobial Value |
|---|---|---|---|---|---|---|
| Description | cfu/ml | Log/ml | cfu/ml | Log/ml | G = Log $T_t$ − $T_0$ | A = F − G |
| Terry Towel Swatch-0 Wash | 100000 | 5.00 | 55000 | 4.74 | −0.26 | 2.04 |

TABLE 2

Test Bacteria: Methicillin Resistant *Staphylococcus aureus* (MRSA)-S 129
Quantitative Assessment ISO 20743: 2007(E) (Plate Count Method)

Lab Control: Concentration of Inoculum at 0 hrs. ($C_0$) = 7.50 × $10^4$ CFU/ml Log: 4.87
Lab Control: Concentration of Bacteria on after 20 hours ($C_t$) = 5.90 × $10^6$ CFU/ml Log: 6.77
Growth Value of F (F = Log $C_t$ − Log$C_0$) = 1.90

| Sample | Concentration of Inoculum at 0 hrs. Test Fabric ($T_0$) | | Concentration of Bacteria at 20 hrs. Test Fabric ($T_t$) | | Growth Value | Antimicrobial Value |
|---|---|---|---|---|---|---|
| Description | cfu/ml | Log/ml | cfu/ml | Log/ml | G = Log $T_t$ − $T_0$ | A = F − G |
| Terry Towel Swatch-0 Wash | 80000 | 4.90 | 54000 | 4.73 | −0.17 | 2.07 |

After 100 washes the antibacterial activity is shown is Tables 3 and 4 below.

TABLE 3

Test Bacteria: *Escherichia coli* ATCC 11229
Quantitative Assessment ISO 20743: 2007(E) (Plate Count Method)

Lab Control: Concentration of Inoculum at 0 hrs. ($C_0$) = 9.60 × $10^4$ CFU/ml Log: 4.98
Lab Control: Concentration of Bacteria on after 20 hours ($C_t$) = 4.90 × $10^6$ CFU/ml Log: 6.69
Growth Value of F (F = Log $C_t$ − Log$C_0$) = 1.71

| Sample | Concentration of Inoculum at 0 hrs. Test Fabric ($T_0$) | | Concentration of Bacteria at 20 hrs. Test Fabric ($T_t$) | | Growth Value | Antimicrobial Value |
|---|---|---|---|---|---|---|
| Description | cfu/ml | Log/ml | cfu/ml | Log/ml | G = Log $T_t$ − $T_0$ | A = F − G |
| TERRY TOWEL-100 WASH | 97000 | 4.98 | 47000 | 4.67 | −0.31 | 2.02 |

TABLE 4

Test Bacteria: Methicillin Resistant *Staphylococcus aureus* (MRSA)-S 129
Quantitative Assessment ISO 20743: 2007(E) (Plate Count Method)

Lab Control: Concentration of Inoculum at 0 hrs. ($C_0$) = 1.00 × $10^5$ CFU/ml Log: 5.00
Lab Control: Concentraton of Bacteria on after 20 hours ($C_t$) = 5.10 × $10^6$ CFU/ml Log: 6.70
Growth Value of F (F = Log $C_t$-Log $C_0$) = 1.70

TABLE 4-continued

| Test Bacteria: Methicillin Resistant *Staphylococcus aureus* (MRSA)-S 129 Quantitative Assessment ISO 20743: 2007(E) (Plate Count Method) | | | | | | |
|---|---|---|---|---|---|---|
| Sample | Concentraion of Inoculum at 0 hrs. Test Fabric ($T_0$) | | Concentration of Bacteria at 20 hrs. Test Fabric ($T_t$) | | Growth Value | Antimicrobial Value |
| Description | cfu/ml | Log/ml | cfu/ml | Log/ml | $G = \text{Log } T_t\text{-}T_0$ | A = F − G |
| TERRY TOWEL—100 WASH | 104000 | 5.01 | 51000 | 4.70 | −0.31 | 2.01 |

The Growth Value and Antimicrobial Value of the towel after 50 washes was comparable to the values for the towel after 100 washes.

The data shows that a towel of the invention comprising a fibre of the invention has potent antimicrobial activity, even after a significant number of washes at a high temperature.

Example 4—Antimicrobial Activity of Polyester Fibres

A terry towel was prepared using 7% of the fibres of Example 2 and 93% cotton.

The terry towel was tested for antimicrobial activity following JIS L 1902. This method is designed to test the ability of fabrics that have been treated with antimicrobial agents to prevent microbial growth and to kill microorganisms. The antimicrobial test was carried out on a towel that had been subjected to 0 washes, 75 washes and 100 washes.

The JIS L 1902 standard has a Pass or Fail grading system where a Pass is achieved with an R value of greater than 2. The towel of the invention was tested against two test microorganisms: *Staphylococcus aureus* (CECT 240, ATCC 6538P) and *Escherichia coli* (CECT 516, ATCC 8739).

The tested terry towel gave an R value of greater than 2 in at all tested number of washes and against both test microorganisms. Showing that polyester fibres and textiles comprising such fibres exhibit antimicrobial activity.

Example 5—Antibacterial Activity

In a further example, a textile of the present invention has been submitted to an antimicrobial evaluation. The textile was a sock fabric comprising yarns of the present invention. The test procedure is shown below in Table 5.

TABLE 5

| | |
|---|---|
| Test Method | ASTM WK#45351 |
| Test Organism | *Escherichia coli* (ATCC #25922) |
| Test Solution Nutrient Load | Tryptic Soy Broth (TSB) in deionized H2O (1:500) |
| Test Sample Dimensions | 0.40 g ± 0.05 g, cut into squares |
| Inoculum Applied to Test Sample | 0.2 mL |
| Contact Time | 24 h ± 10 min |
| Neutralizer | 10 mL Dey/Engley (D/E) Neutralizing Broth (1x) |
| Measuring Method of Number of Living Bacteria | Dilution Plate Method on Tryptic Soy Agar (TSA) plates |
| Method of Sterlization | None |
| Method of Laundering | None |

The results of the test (Table 6, 900BS-2) show a near complete removal of *E. coli* present on the square of textile or the invention after 24 hours incubation. The control sample, N110, shows no reduction in bacteria, as expected.

TABLE 6

ASTM WK#45351
Quantitative Evaluation of Bactericidal Activity of Treated Articles (versus *E. coli*)

| | |
|---|---|
| Concentration of Inoculum (CFU/mL) | $2.25 \times 10^5$ = 5.36 log |
| Standard Control after 24 h incubation (CFU/g) | $3.43 \times 10^5$ = 5.53 log |
| Control Growth Value | +0.17 log |

| Sample Name | Bacteria Recovered (CFU/g) | Log Recovery | Log Reduction | % Reduction |
|---|---|---|---|---|
| N110 | 7.02E3 | 3.85 | — | — |
| 900BS-2 | <2.48E+00 | <0.39 | >3.45 | >99.96% |

Example 6—Anti-leaching

A bed sheet of the present invention consisting of 9% of polyester fibre comprising silver particles and 94% cotton was submitted to a test to determine the extent of leaching of silver particles from the textile. Table 7 details the test method employed.

TABLE 7

| | |
|---|---|
| Test Method | ASTM E 2149 |
| Test Organism | *E. coli* (ATCC #25922) |
| Media | Trypticase Soy Broth/Agar |
| Test Sample Dimensions | 1 gram swatches ± .1 gram |
| Contact Time | 1 h ± 5 min |
| Measuring Method of Number of Living Bacteria | Dilution plating and colony counting. |
| Method of Sterlization | None |
| Method of Laundering | None |

Table 8 below contains the results from the test method. Antibacterial efficacy is observed for the swatch of bed sheet of the invention compared to the control experiment, 5. In addition, no leeching of the silver particles was observed.

TABLE 8

| | |
|---|---|
| Number of Replicate Experiments | 2 |
| Average Concentration of Inoculum (CFU/mL) | 1.27E+05 |
| Average Control Growth Value | −0.29 |

| Sample Name | Average % reduction vs 5 | Observations |
|---|---|---|
| 5 (28/1PB-5248) | 0 | |
| 6 (28/1PC-6535 BS) | −4.17% | No leeching detected |
| 7 (30/2PC-6535 BS) | −19.42% | No leeching detected |

Example 7—*E. coli* Antibacterial Activity

Fabrics woven with wefts composed completely of picks containing 20% fibre of the invention blended with 80% cotton were demonstrated to entirely eradicate *E. coli* after 24 hours of incubation. Fabrics that either did not contain fibres of the invention were unable to reduce bacterial growth and actually showed increases in *E. coli* concentrations after 24 hours of incubation. This is shown in the data contained in Table 9.

The data in table 9 was obtained with the following procedure. *E. coli* (ATCC #35984) broth cultures were prepared by transferring a single colony into 20 mL of sterilized Tryptic Soy Broth (TSB). The culture was then incubated at 37° C. on an orbital shaker at 200 RPM for 18 hours. On testing day, a liquid inoculum of $6.25\times10^5$ colony forming units (CFU)/mL was prepared in inoculation medium (TSB diluted 1:500 in sterilized, deionized $H_2O$). Three square swatches, weighing 0.40 g±0.05 g, of each fabric type, per time point (2) were cut and dry weights were recorded. Each swatch was placed into labelled 50-mL tubes such that the fabric square forms a cup-shape. A 0.2 mL aliquot of inoculum solution was placed onto the swatches at several points taking care to ensure that no inoculum touches the surface of the vial. Tubes were sealed loosely with caps. Swatches were incubated for 0 and 24 hours. Bacteria from the 0 hour swatches were recovered immediately into 1×D/E neutralizing buffer. 24 hour swatches were incubated at 37° C. for 24 hours in a humidified chamber. Following incubation, 24 hour bacteria was recovered into 1×D/E neutralizing buffer. Following recovery, all tubes were vortexed for 1 minute. Bacterial samples were then dilution plated and incubated overnight at 37° C. For each plate, colonies were counted and recorded. Percent or log reductions were based on geometric mean of the data. Experiments were run in triplicate. Results are expressed as CFU/gram of fabric.

TABLE 9

| Fabric type by picks | No fibre of the invention | 2 picks cotton:1 pick fibre of the invention | All picks fibre of the invention |
|---|---|---|---|
| Immediately after inoculation | $1.74\times10^5$ CFU/gram (5.23 log) | $2.41\times10^5$ CFU/gram (5.29 log) | $2.21\times10^5$ CFU/gram (5.27 log) |
| 24 hours after inoculation | $2.68\times10^7$ CFU/gram (7.26 log) | $1.24\times10^7$ CFU/gram (7.06 log) | 0 CFU/gram (0.00 log) |
| Change from 0-24 hours (log) | +2.03 | +1.77 | −5.27 (at least −7 relative to No fibre of the invention |

Example 8—Antimicrobial Efficacy Against MRSA

Sample Products:

Two tubular fabrics, one containing silver incorporated into polyester polymer threads as per the invention, and one control fabric with only polyester threads. These were cut in to 0.4 g samples. There were three replicate samples per time-point.

Experimental Protocols for this task:

Examining bactericidal effect of silver incorporated polyester fabric materials—humid incubation.

This test was based on the Hong Kong test for silver containing products. Methicillin Resistant *Staphylococcus aureus* (MRSA) was grown overnight in 5 ml Luria broth (LB) at 37° C., with 150 rpm shaking. This culture was used to inoculate the pieces of material with 200 µl of MRSA culture diluted 1/10 (for 0.4 g size samples), and placed in sealed tubes and placed in a 37° C. incubator for 0, 1, or 24 hours. The standard sock was used as a negative control, and all samples mentioned were in triplicate for each time-point. Upon reaching a time-point, the samples were transferred to 5 ml phosphate buffered saline (PBS) containing glass beads. Samples were then vortexed for 25 s, before diluting in PBS and plating on LB agar plates. Plates were incubated overnight at 37° C., viable cells were counted, and the plates were returned to incubate at 37° C. for a further 24 hours before re-counting. Viable MRSA numbers are recorded as Colony Forming Units (CFU) per ml.

Examining bactericidal effect of silver incorporated polyester fabric materials incor—dry incubation This test was based on the Hong Kong test for silver containing products, with the following changes to allow for more realistic testing of the samples. Methicillin Resistant *Staphylococcus aureus* (MRSA) was grown overnight in 5 ml Luria broth (LB) at 37° C., with 150 rpm shaking. This culture was used to inoculate the pieces of material with 200 µl of MRSA culture diluted 1/10 (for 0.4 g size samples), and placed in closed but not sealed Petri dishes and placed in a 37° C. incubator for 0, 1, or 24 hours. The standard sock was used as a negative control, and all samples mentioned were in triplicate for each time-point. Upon reaching a time-point, the samples were transferred to 5 ml phosphate buffered saline (PBS) containing glass beads. Samples were then vortexed for 25 s, before diluting in PBS and plating on LB agar plates. Plates were incubated overnight at 37° C., viable cells were counted, and the plates were returned to incubate at 37° C. for a further 24 hours before re-counting. Viable MRSA numbers are recorded as Colony Forming Units (CFU) per ml.

The results of both the dry and humid incubation tests are shown in Table 10. The results show that socks containing fibres of the invention provide a substantial reduction in MRSA cell count in both humid and dry incubation.

TABLE 10

| Sample | Time (hr) | | | Log reduction | Log reduction at |
|---|---|---|---|---|---|
| Average | 0 | 1 | 24 | at 1 hours | 24 hours |
| Silver sock humid | 1.71E+07 | 6.03E+05 | 2.44E+03 | 1.5 | 3.8 |
| Control Sock humid | 1.89E+07 | 1.69E+07 | 2.44E+07 | 0.0 | −0.1 |
| Silver sock dry | 3.56E+07 | 2.61E+06 | 5.78E+03 | 1.1 | 3.8 |
| Control Sock dry | 6.61E+07 | 2.33E+07 | 1.75E+05 | 0.5 | 2.6 |

Example 9—Antibacterial Activity of a Towel

In a further example, a towel of the present invention was submitted to an antimicrobial evaluation. The towel was a 700GSM terry towel comprised of 97% cotton and 3% polyester fibre comprising silver particles as per the invention The test procedure is shown below in Table 11.

TABLE 11

| | |
|---|---|
| Test Method | ASTM WK#45351 |
| Test Organism | *Escherichia coli* (ATCC #25922) |
| Test Solution Nutrient Load | Tryptic Soy Broth (TSB) in deionized H2O (1:500) |
| Test Sample Dimensions | 0.40 g ± 0.05 g, cut into squares |
| Inoculum Applied to Test Sample | 0.2 mL |
| Contact Time | 24 h ± 10 min |
| Neutralizer | 10 mL Dey/Engley (D/E) Neutralizing Broth (1x) |
| Measuring Method of Number of Living Bacteria | Dilution Plate Method on Tryptic Soy Agar (TSA) plates |
| Method of Sterlization | None |
| Method of Laundering | None |

The results of the test (Table 12) show a near complete removal of *E. coli* present on the square of terry towel of the invention (designated Bioshield) after 24 hours incubation. The control sample, "non-Bioshield", shows no reduction in bacteria, as expected.

TABLE 12

ASTM WK#45351
Quantitative Evalation of Bactericidal Activity of Treated Articles (versus *E. coli*)

| | |
|---|---|
| Number of Replicate Experiments | 2 |
| Average Concentration of Inoculum (CFU/mL) | $4.46 \times 10^5$ = 5.65 log ± 0.24 log |
| Average Control after 24 h incubation (CFU/g) | $5.78 \times 10^4$ = 4.76 log |
| Average Control Growth Value | −0.41 log |

| Sample Name | Average Bacteria Recovered (CFU/g) | Average Log Recovery | Average Log Reduction | Average % Reduction |
|---|---|---|---|---|
| 1 & 2 (non-Bioshield)) | $7.35 \times 10^6$ | 6.87 | — | — |
| 4 (Bioshield) | $1.52 \times 10^2$ | 2.18 | 4.69 | 99.998% |

Example 10

Figure 5:
FIG. 5 is an image of an article of the present invention in the form of a bag containing milk. The bag labelled 0 does not comprise any silver particles and is not a bag of the invention. The bag labelled 2 comprises silver particles as defined in the invention and is therefore an article of the present invention.

FIG. 5 shows a plastics bag, labelled 2, formed of a polymer batch comprising silver particles according to the present invention. The bag was formed by extruding a thin film of the polymer batch of the invention and sealing the edges to form a bag. The bag in the present example contains milk, as can be seen in example FIG. 5. A comparative example of a standard plastic bag is labelled 0. This bag does not comprise silver particles and also contains milk. Both bags and their contents were stored at room temperature for 5 days. It is evident from FIG. 5 that the milk in the comparative example bag (0) has developed solid deposits, showing that the milk is no longer fit for consumption. However, in contrast the milk in the bag of the present invention, 2, has not developed solid deposits. The bag of the present invention has therefore been demonstrated to maintain food fresher than a comparative plastic bag.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A polymer batch comprising a polymer material and non-spherical silver particles, wherein the silver particles have (i) a size characteristic of particles formed by grinding silver leaf, and (ii) a length, a width, and a depth, and wherein the depth of the silver particles is less than 0.5 μm and at least one of the length or the width of the silver particles is from 1 μm to about 10 μm.

2. The polymer batch of claim 1 in a solid or molten form.

3. The polymer batch of claim 1, wherein the silver particles are present in an amount of from about 0.1% to about 10% by weight of the polymer batch.

4. The polymer batch of claim 1, wherein the silver particles are present in an amount of from about 0.1% to about 5%, about 0.5% to about 4%, about 0.5% to about 3%, about 0.1% to about 3%, or about 1.5% to about 2.5% by weight of the polymer batch.

5. The polymer batch of claim 1, wherein silver particles are present in an amount of from about 0.003% to about 0.5% by weight, from about 0.03% to about 0.5%, from about 0.03% to about 0.25%, from about 0.05% to 0.15%, from about 0.06% to 0.15%, from about 0.03% to 0.1%, or from about 0.06% to 0.1% by weight of the polymer batch.

6. The polymer batch of claim 1, wherein the silver leaf has a thickness of less than 0.5 μm.

7. The polymer batch of claim 1, wherein the depth of the silver particles is less than 0.3 μm, or less than 0.1 μm.

8. The polymer batch of claim 1, wherein at least one of the length or the width of the silver particles is from 1 μm to about 10 μm; or from 1 μm to about 8 μm; or from 1 μm to about 6 μm; or from 1 μm to about 4 μm; or from about 2 μm to about 3 μm.

9. The polymer batch of claim 1, wherein the polymer batch does not comprise an agglomeration inhibitor.

10. The polymer batch of claim 1, wherein the silver leaf has a thickness less than 0.3 μm, or less than 0.1 μm.

11. The polymer batch of claim 1, wherein both the length and the width of the silver particles are from 1 μm to about 10 μm.

12. The polymer batch of claim 1, wherein only one of the length or the width of the silver particles is from 1 μm to about 10 μm.

13. An article comprising a polymer batch of claim 1.

14. An article of claim 13, wherein the article is formed of a single piece.

15. A fibre obtainable by extruding the polymer batch of claim 1.

16. A fibre comprising a polymer material and non-spherical silver particles, wherein the silver particles have (i) a size characteristic of particles formed by grinding silver leaf, and (ii) a length, a width, and a depth, and wherein the depth of the silver particles is less than 0.5 μm and at least one of the length or the width of the silver particles is from 1 μm to about 10 μm.

17. The fibre of claim 16, wherein silver particles are present in an amount of from about 0.003% to about 0.5% by weight, from about 0.03% to about 0.5%, from about 0.03% to about 0.25%, from about 0.05% to 0.15%, from about 0.06% to 0.15%, from about 0.03% to 0.1%, or from about 0.06% to 0.1% by weight of the fibre.

18. The fibre of claim 16, wherein the silver leaf has a thickness of less than 0.5 μm.

19. The fibre of claim 16, wherein the depth of the silver particles is less than 0.3 μm, or less than 0.1 μm.

20. The fibre of claim 16, wherein at least one of the length or the width of the silver particles is from 1 μm to about 10 μm; or from 1 μm to about 8 μm; or from 1 μm to about 6 μm; or from 1 μm to about 4 μm; or from about 2 μm to about 3 μm.

21. The fibre of claim 16, wherein the fibre does not comprise an agglomeration inhibitor.

22. A yarn comprising a fibre of claim 16.

23. A textile comprising a fibre of claim 16.

24. The fibre of claim 16, wherein the silver leaf has a thickness less than 0.3 μm, or less than 0.1 μm.

25. The fibre of claim 16, wherein both the length and the width of the silver particles are from 1 μm to about 10 μm.

26. The fibre of claim 16, wherein only one of the length or the width of the silver particles is from 1 μm to about 10 μm.

27. A fibre obtainable by a method comprising:

preparing non-spherical silver particles by grinding silver leaf;

mixing the silver particles with a polymer material, wherein the silver particles have a depth of less than 0.5 μm and at least one of a length or a width of from 1 μm to about 10 μm; and extruding the mixture of silver particles and the polymer material to form said fibre.

28. The fibre of claim 27, wherein both the length and the width of the silver particles are from 1 μm to about 10 μm.

29. The fibre of claim 27, wherein only one of the length or the width of the silver particles is from 1 μm to about 10 μm.

30. A method of producing a fibre, the method comprising:

preparing non-spherical silver particles by grinding silver leaf, wherein the silver particles have a depth of less than 0.5 μm and at least one of a length or a width of from 1 μm to about 10 μm;

mixing the silver particles with a polymer material; and extruding the mixture of silver particles and the polymer material to form fibres.

31. The method of claim 30, wherein the method comprises:

mixing the silver particles with a powdered or molten polymer material;

optionally melting the polymer material and silver particle mixture, when the polymer material is a powder;

extruding the mixture of silver particles and the polymer material;

pelletizing the extruded mixture to form master batch pellets;

mixing the master batch pellets with further polymeric material; and extruding a molten mixture of master batch pellets and the polymer material to form fibres.

* * * * *